(12) United States Patent
Hamed

(10) Patent No.: US 11,794,856 B2
(45) Date of Patent: Oct. 24, 2023

(54) FRONT DERAILLEUR ELECTRICAL ACTUATOR

(71) Applicant: Hazem Nihad Hamed, Los Angeles, CA (US)

(72) Inventor: Hazem Nihad Hamed, Los Angeles, CA (US)

( * ) Notice: Subject to any disclaimer, the term of this patent is extended or adjusted under 35 U.S.C. 154(b) by 0 days.

(21) Appl. No.: 18/109,816

(22) Filed: Feb. 14, 2023

(65) Prior Publication Data
US 2023/0192235 A1    Jun. 22, 2023

(51) Int. Cl.
*B62M 9/132* (2010.01)
*B62M 9/134* (2010.01)

(52) U.S. Cl.
CPC ............ *B62M 9/132* (2013.01); *B62M 9/134* (2013.01)

(58) Field of Classification Search
CPC ...... B62M 9/131; B62M 9/132; B62M 9/133; B62M 9/134; B62M 9/1342; B62M 9/1348; B62M 9/121; B62M 9/122; B62M 9/123; B62M 9/124; B62M 25/08; B62M 2025/003
See application file for complete search history.

(56) References Cited

U.S. PATENT DOCUMENTS

| | | | | |
|---|---|---|---|---|
| 6,767,308 B2* | 7/2004 | Kitamura | ............... | B62K 25/04 477/7 |
| 6,979,009 B2* | 12/2005 | Ichida | ............... | B62M 9/132 280/238 |
| 7,291,079 B2* | 11/2007 | Ichida | ............... | B62M 25/08 474/80 |
| 7,306,531 B2* | 12/2007 | Ichida | ............... | B62M 25/08 474/70 |
| 7,331,890 B2* | 2/2008 | Ichida | ............... | B62M 9/132 474/80 |
| 7,341,532 B2* | 3/2008 | Ichida | ............... | B62M 9/132 474/70 |
| 7,651,423 B2* | 1/2010 | Ichida | ............... | B62K 23/06 74/519 |
| 8,282,519 B2* | 10/2012 | Ichida | ............... | B62M 9/132 474/82 |
| 8,888,620 B2 | 11/2014 | Emura et al. | | |
| 8,979,683 B2 | 3/2015 | Katsura et al. | | |
| 9,085,340 B1 | 7/2015 | Sala et al. | | |
| 9,394,030 B2* | 7/2016 | Shipman | ............... | B62M 25/08 |
| 9,555,857 B2 | 1/2017 | Kuwayama et al. | | |
| 9,573,653 B2 | 2/2017 | Pasqua | | |
| 9,682,744 B2 | 6/2017 | Watarai | | |
| 9,809,276 B2 | 11/2017 | Katsura et al. | | |
| 9,815,522 B2* | 11/2017 | Tachibana | ............... | B62M 25/08 |

(Continued)

FOREIGN PATENT DOCUMENTS

| CN | 1712308 A | * | 12/2005 | ............ | B62M 9/132 |
|---|---|---|---|---|---|
| DE | 102020211139 A1 | * | 12/2021 | ............ | B62M 25/08 |
| EP | 1475302 A1 | * | 11/2004 | ............ | B62M 25/08 |

*Primary Examiner* — Michael R Mansen
*Assistant Examiner* — Raveen J Dias

(57) ABSTRACT

An electrical actuator for a bicycle front derailleur making use of a standard wireless remote control (RC) servo unit relying exclusively on highly efficient spur gearing reduction and facilitating highly accurate derailleur positioning thereof through an integral digital magnetic rotary encoder with assembly thereof sealed in a two-piece housing and serving to transmit actuation effort thereof directly to actuation shaft of a front derailleur.

15 Claims, 15 Drawing Sheets

(56) References Cited

U.S. PATENT DOCUMENTS

| | | | |
|---|---|---|---|
| 9,873,482 B2 | 1/2018 | Nishino | |
| 9,890,838 B2* | 2/2018 | Shipman | F16H 9/06 |
| 10,040,511 B2* | 8/2018 | Shipman | B62M 9/122 |
| 10,053,189 B2* | 8/2018 | Pasqua | B62M 9/132 |
| 10,086,907 B2* | 10/2018 | Tachibana | H04B 1/3827 |
| 10,569,836 B2* | 2/2020 | Hamed | B62J 45/20 |
| 10,640,171 B2 | 5/2020 | Hamed | |
| 10,668,984 B2* | 6/2020 | Shipman | B62M 9/122 |
| 10,696,358 B2 | 6/2020 | Bernardele | |
| 10,745,081 B2* | 8/2020 | Ueda | B62M 9/132 |
| 10,876,607 B2* | 12/2020 | Shipman | B62M 9/132 |
| 11,046,390 B2* | 6/2021 | Hamed | B62K 23/06 |
| 11,192,607 B2 | 12/2021 | Fujimoto | |
| 11,345,441 B2* | 5/2022 | Hamed | B62M 25/08 |
| 11,479,323 B2* | 10/2022 | Hamed | B62M 25/02 |
| 11,554,832 B2 | 1/2023 | Fujimoto et al. | |
| 11,565,772 B2 | 1/2023 | Fujimoto et al. | |
| 11,566,702 B2 | 1/2023 | Chuang | |
| 11,584,478 B2 | 2/2023 | Shahana | |
| 11,597,470 B2 | 3/2023 | Kondo | |
| 11,597,471 B2 | 3/2023 | Shahana | |
| 11,618,532 B2 | 4/2023 | Jordan | |
| 11,623,713 B2 | 4/2023 | Shahana et al. | |
| 2002/0128106 A1* | 9/2002 | Kitamura | B62M 9/132 475/2 |
| 2005/0189158 A1* | 9/2005 | Ichida | B62M 25/08 180/260 |
| 2005/0192137 A1* | 9/2005 | Ichida | B62M 9/132 474/70 |
| 2005/0192139 A1* | 9/2005 | Ichida | B62M 25/08 474/70 |
| 2005/0197222 A1* | 9/2005 | Tatsumi | B62M 9/132 474/70 |
| 2005/0205323 A1* | 9/2005 | Ichida | B62M 9/132 474/80 |
| 2005/0239587 A1* | 10/2005 | Ichida | B62M 9/122 474/82 |
| 2005/0277503 A1* | 12/2005 | Ichida | B62K 23/06 474/80 |
| 2008/0132364 A1* | 6/2008 | Ichida | B62M 25/08 474/70 |
| 2014/0087901 A1* | 3/2014 | Shipman | B62M 9/1242 429/100 |
| 2014/0114538 A1* | 4/2014 | Shipman | B62M 9/132 474/80 |
| 2016/0288878 A1* | 10/2016 | Shipman | B62M 9/132 |
| 2017/0101155 A1* | 4/2017 | Tachibana | B62K 25/286 |
| 2017/0101162 A1* | 4/2017 | Tachibana | B62M 25/08 |
| 2017/0158285 A1* | 6/2017 | Tachibana | B62M 9/122 |
| 2017/0341708 A1* | 11/2017 | Bernardele | B62M 9/132 |
| 2018/0001960 A1* | 1/2018 | Pasqua | B62M 25/08 |
| 2018/0045283 A1* | 2/2018 | Shipman | B62M 9/132 |
| 2018/0065708 A1* | 3/2018 | Shipman | B62M 9/121 |
| 2019/0031287 A1* | 1/2019 | Ueda | B62M 9/122 |
| 2019/0249769 A1* | 8/2019 | Hamed | F16H 63/42 |
| 2020/0207443 A1* | 7/2020 | Mizutani | B62M 9/132 |
| 2020/0216144 A1* | 7/2020 | Hamed | B62K 23/06 |
| 2020/0255089 A1* | 8/2020 | Shipman | B62M 9/132 |
| 2020/0377175 A1* | 12/2020 | Fujimoto | B62M 9/136 |
| 2021/0061413 A1* | 3/2021 | Ichida | B62M 25/08 |
| 2021/0079984 A1* | 3/2021 | Shipman | F16H 9/06 |
| 2021/0331767 A1* | 10/2021 | Hamed | B62M 9/122 |
| 2021/0403124 A1* | 12/2021 | Fujimoto | B62M 9/132 |
| 2021/0403125 A1* | 12/2021 | Fujimoto | B62J 45/413 |
| 2021/0403126 A1* | 12/2021 | Fujimoto | B62J 45/413 |
| 2022/0119075 A1* | 4/2022 | Hamed | B62M 9/122 |
| 2023/0002006 A1* | 1/2023 | Kok | B62M 9/1248 |
| 2023/0014867 A1* | 1/2023 | Hamed | B62M 25/08 |

* cited by examiner

FIG. 8

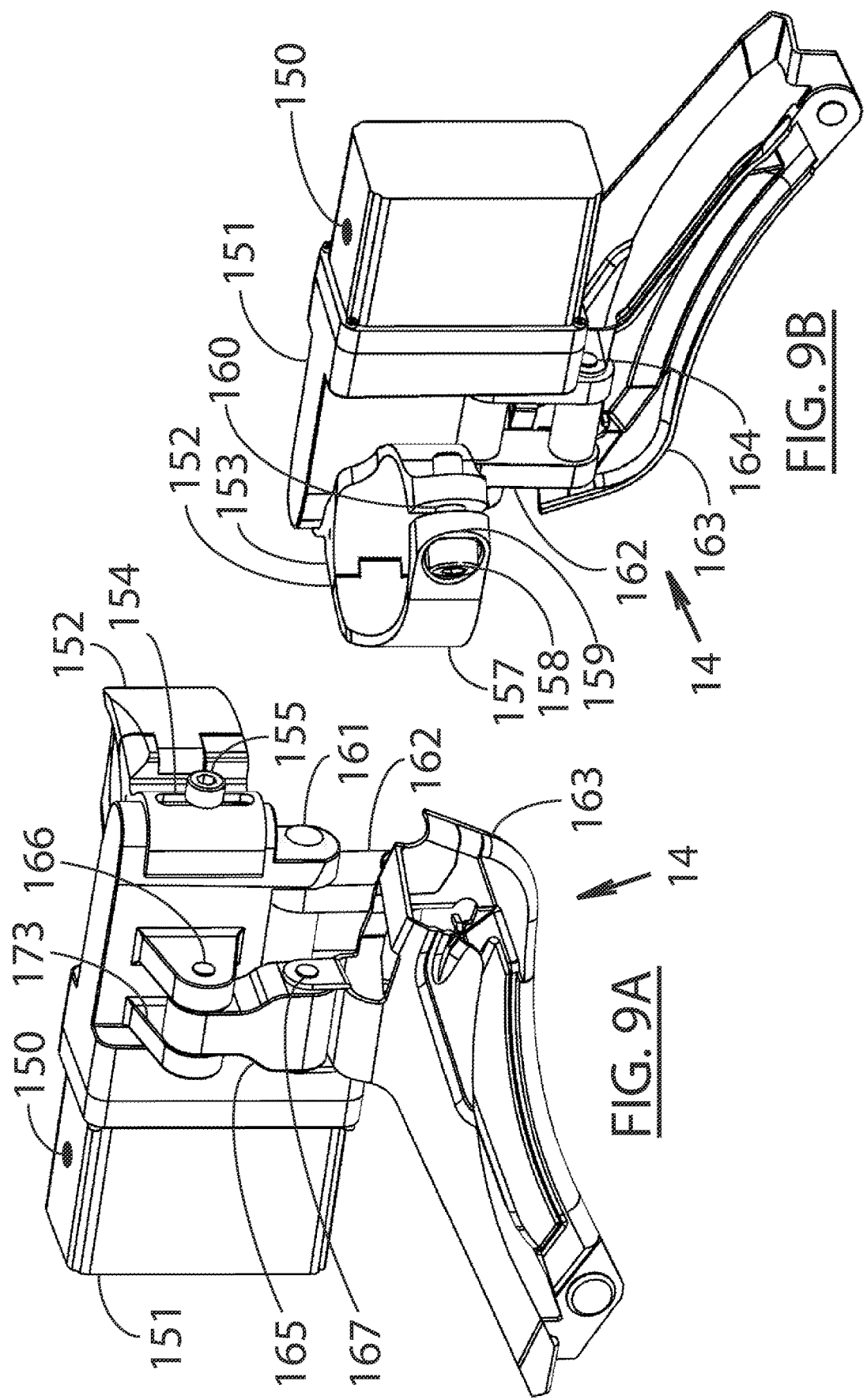

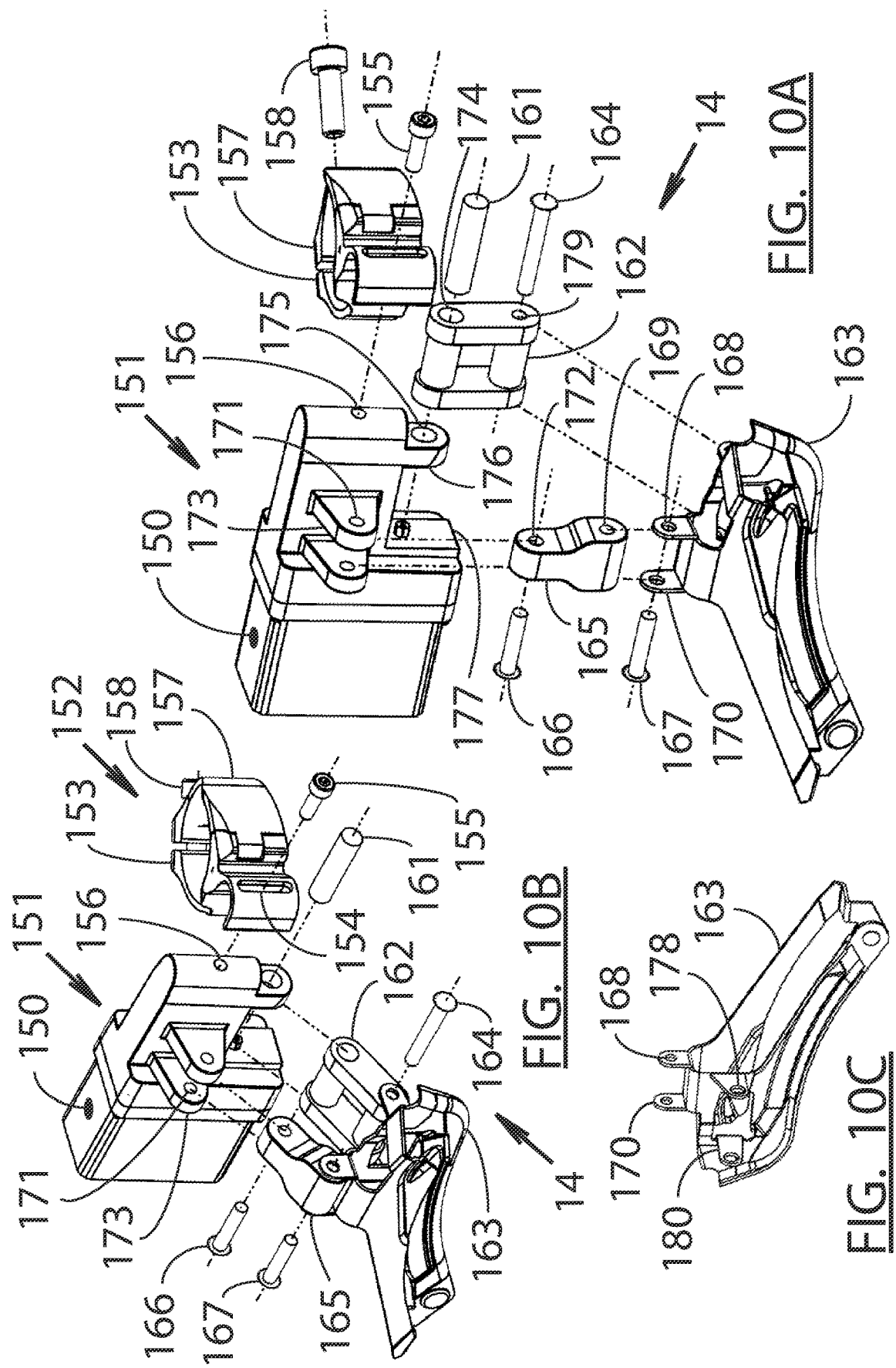

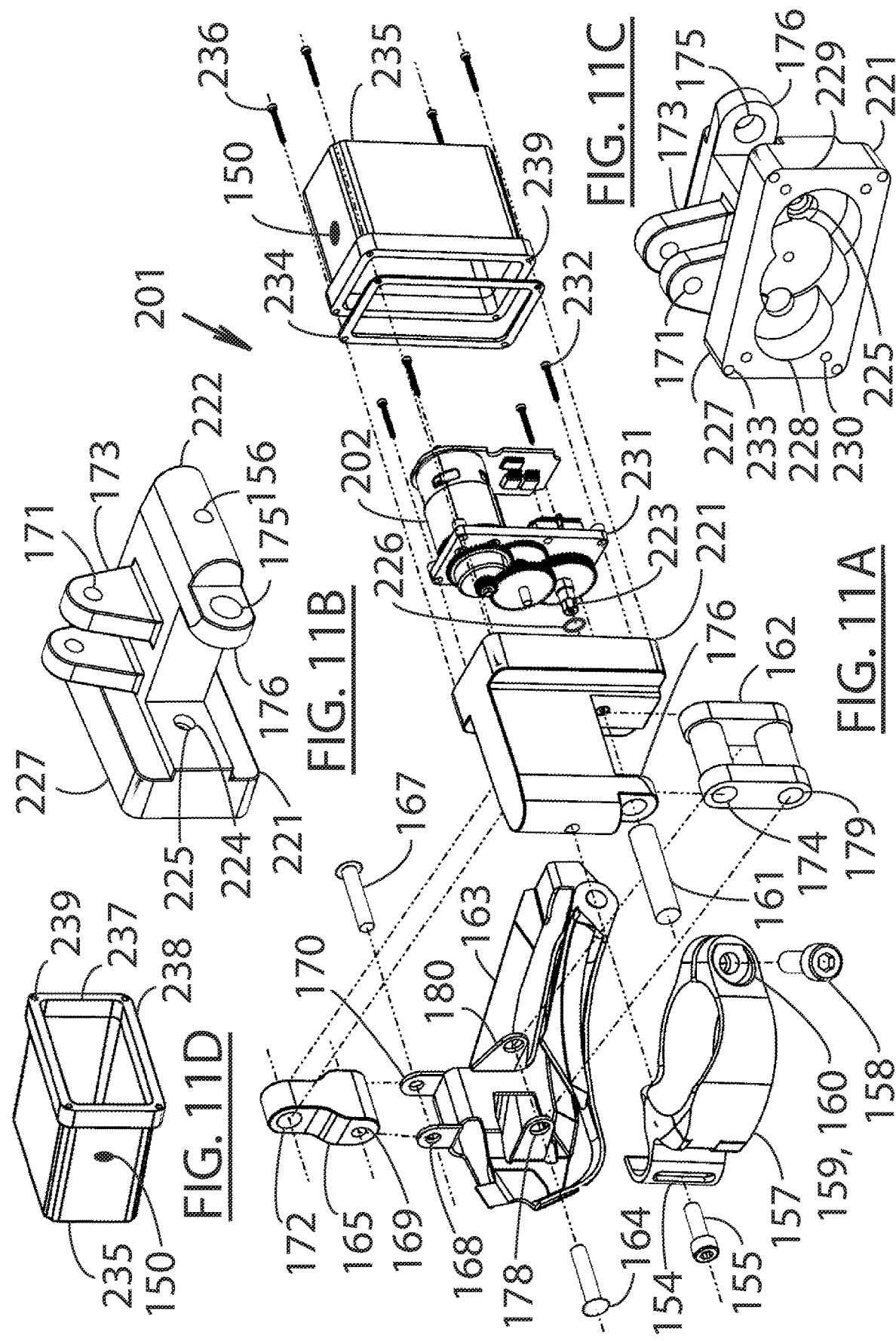

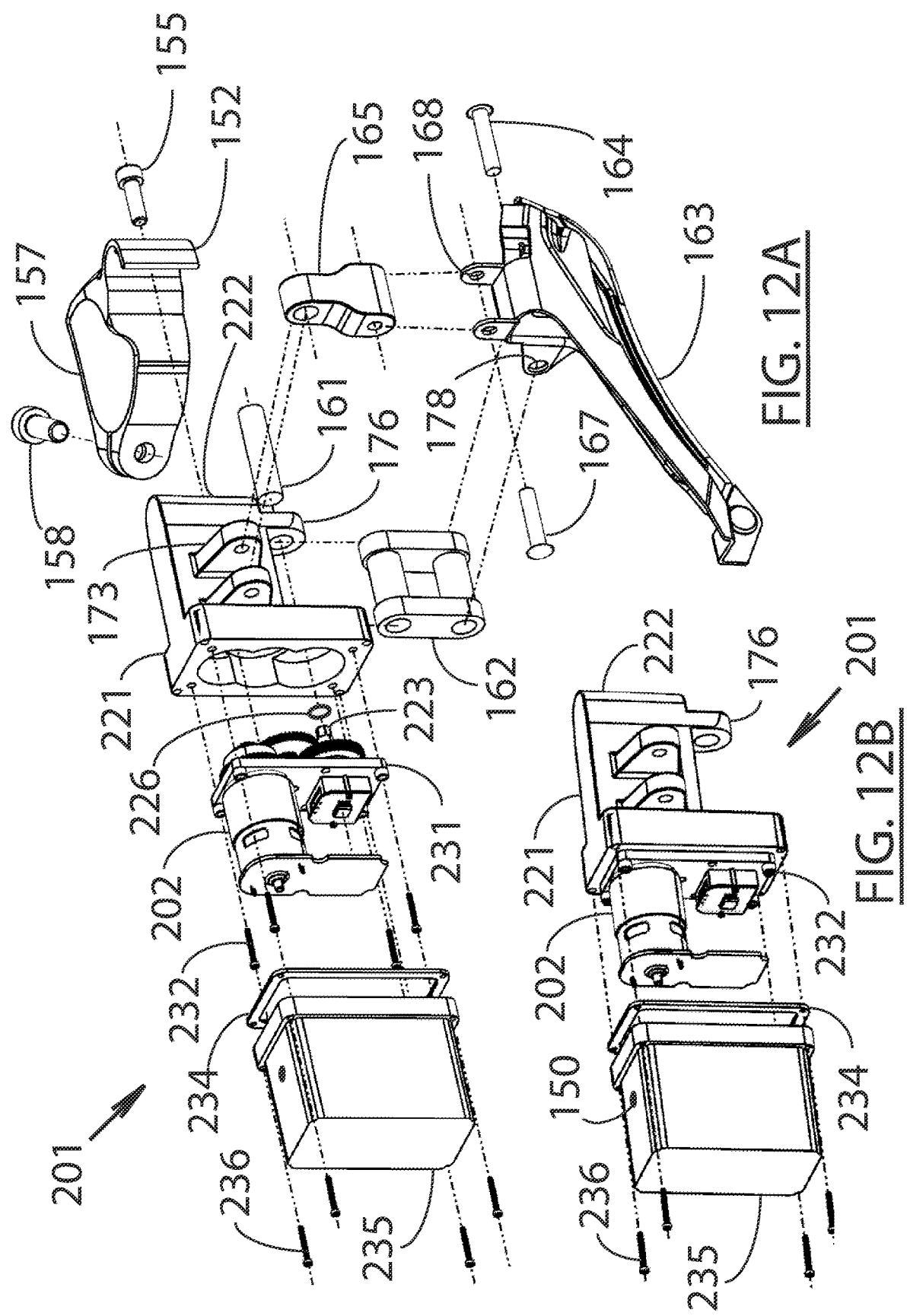

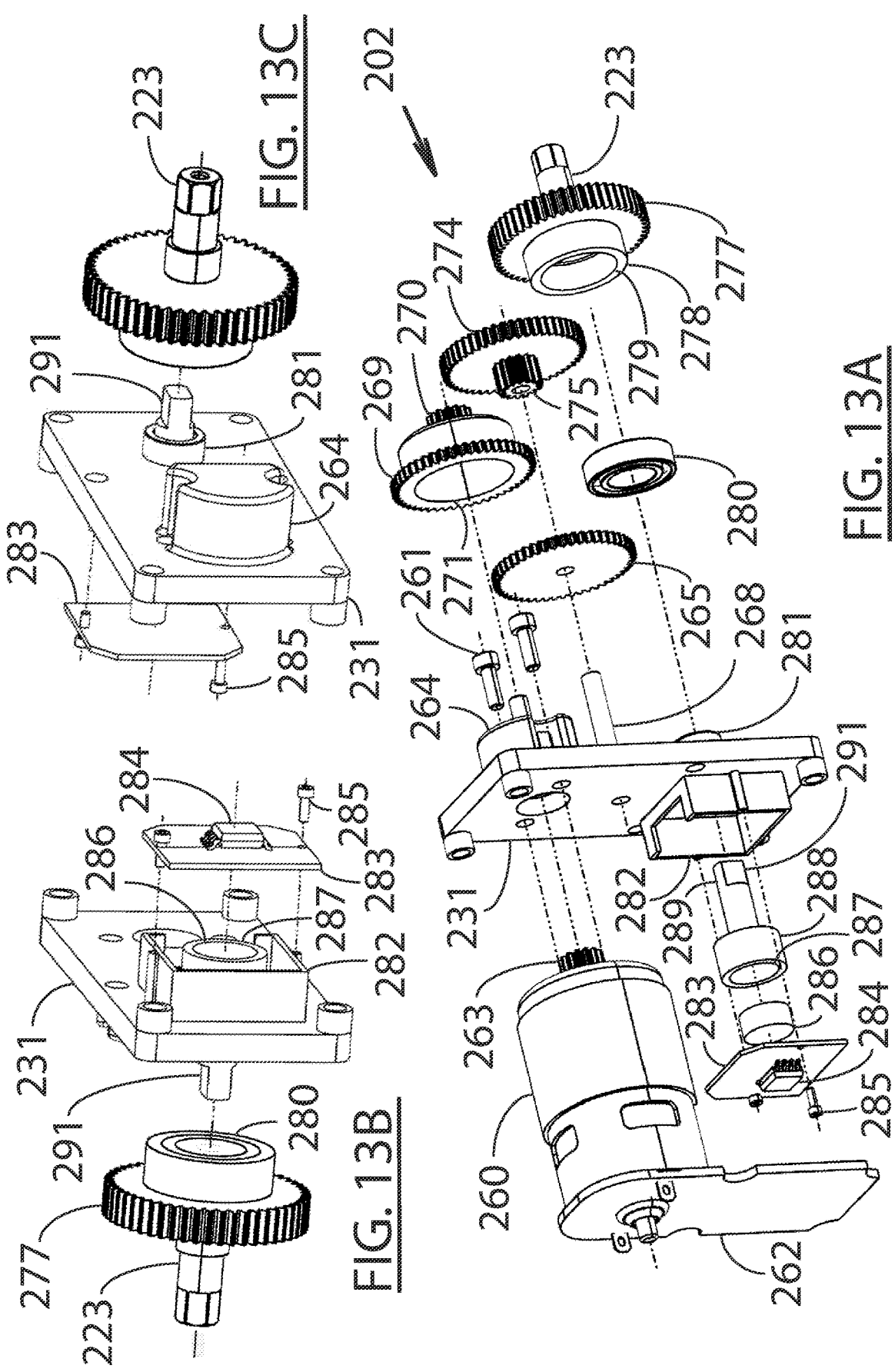

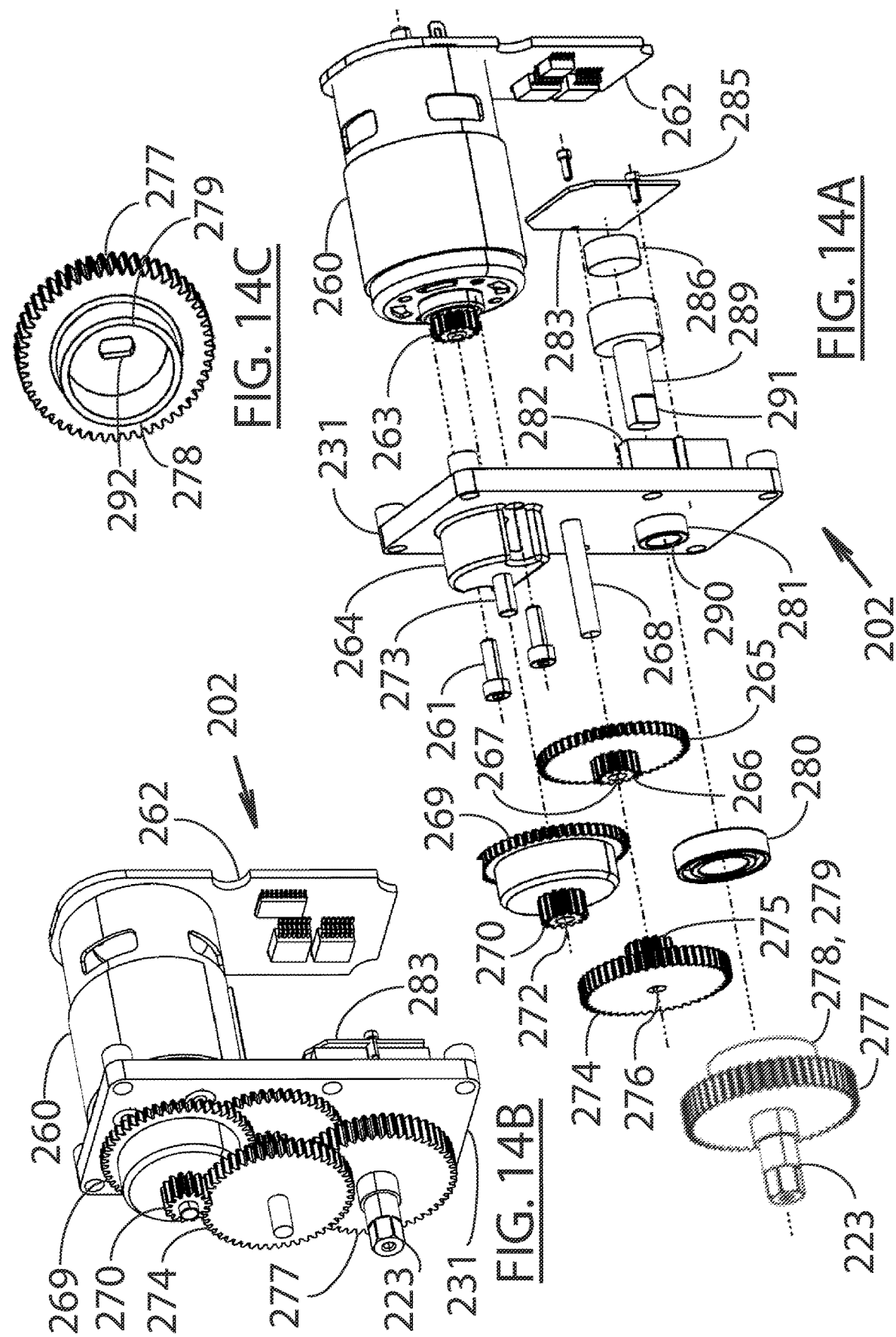

FRONT DERAILLEUR ELECTRICAL ACTUATOR

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear powered drive chain derailleurs serving to alternate drive chain position between different ratio front and rear drive sprockets through wiring to a set of rider control switches, thereby permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently emerged where additional power transmission sprockets of various number of teeth but equal pitch were added in the axial directions of the pedals mechanism as well as power transmission rear wheel to facilitate a combination of front and rear power transmission ratios resulting in optimal settings based on desired bicycle speeds, road conditions, operator biometrics and preference. This innovation was facilitated by the de-facto standard four bar linkage mechanism based derailleur assembly used to this very day to alternate drive sprockets through properly positioning the drive chain thereto as well as compensate for resultant varying chain lengths through an integral spring loaded chain tensioning mechanism. The capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, this apparatus granted the operator the ability to adjust the chain position in the axial direction for proper alignment and thereby engagement of selected rear and front drive sprockets in order to achieve optimal power transmission ratio settings. Advancements in the actuation mechanism included indexing capability of the operator lever assembly so that the actuation of the gearing mechanism takes place in an indexing fashion consistently properly aligning the chain with desired sprocket thereof rather than one continuous motion requiring the operator to guess the proper chain position often leading to positioning errors.

Most recent developments stemming from desire to eliminate shifting cables altogether and additionally relieve operator actuation efforts through replacement of the shifter mechanisms with switching devices, resulted in a number of powered derailleur designs making use of small DC motors acting through typically a worm and spur gearset to drive the derailleur mechanisms through actuation of one of the joints of their four bar linkages, equally applicable to both rear as well as front derailleurs.

As most of these recent designs need to achieve a substantial gearing reduction ratio to amplify the output torque of their fairly small motors to an operational level, they almost exclusively rely on multiple stage proprietary gearing reduction sets making use of at least one worm gearset stage directly realizing the needed substantial reduction but at the cost of diminished efficiency to around 70% for the wormset stage due to the sliding motion between the worm and the worm gear. With their second, third and often fourth stage relying on pure spur gearing strictly based on rolling motions, these later reduction stages achieve substantially higher power transmission efficiencies, typically in the neighborhood of 95% plus per stage.

Consequentially, the typical efficiency range of electrical derailleur reduction gearsets is in the $60^{th}$ percentile neighborhood, simply derived by the product of efficiencies of all stages, leading to oversized motors and higher drain on powering circuits and batteries typically leading to premature componentry wear for most of these commercially available derailleurs.

DISCUSSION OF PRIOR ART

The following is a brief summary of prior art deemed pertinent to the bicycle front derailleur electrical actuator of the present invention.

U.S. Pat. No. 11,458,450 B2 discloses an electronic front derailleur making use of a proprietary geared reduction unit for actuation thereof making use of a first stage worm gearing notwithstanding lower efficiency due to sliding motion between the worm and worm gear leading to higher battery drain, increased motor load and heat generation and thereby shorter componentry life.

U.S. Pat. No. 9,950,769 B2 discloses an assortment of designs for an electronic front derailleur making use of proprietary geared reduction units for actuation thereof, at least one of which making use of a first stage worm gearing set notwithstanding the lower overall efficiency, being the product of efficiencies of all reduction stages, stemming from the worm gearing stage, thereby leading to higher battery drain, increased motor load and heat generation and thereby shorter componentry life.

U.S. Pat. No. 9,573,653 B2 discloses an electronic front derailleur integrating gearing and linkage components. Although this design does offer some potential advantages it does so at the cost of additional weight and costly non-standard and difficult to fabricate components Notwithstanding the extensive endeavor in the art, a standard high efficiency front derailleur actuator apparatus entailing additional highly desirable characteristics such as built-in overload protection, minimal weight and a fast response time remains elusive.

BRIEF SUMMARY OF THE INVENTION

Equally applicable to both front and rear bicycle electrical derailleurs, inventor discloses an actuating gearbox apparatus comprising a widely available high efficiency standard reduction transmission package typically used in wireless remote control (RC) servo units thoroughbred for great space and weight savings, exclusively relying on spur gearing and with on-board electronics serving to directly interpret a pulse width modulated signal to power a directly coupled small cored or coreless DC motor acting through a triple or quadruple spur gearing reduction set with output shaft thereof coupled to a magnetic 12-bit quadrature encoder for high positioning accuracy. In the foregoing front derailleur implementation, target standard remote control (RC) servo mechanism is directly coupled to actuation shaft of the preferred embodiment front derailleur.

A further iteration of the disclosed invention comprises a digitally commutated brushless AC motor, also available as standard off the shelf wireless remote control (RC) servo componentry, in lieu of the brushed DC motor, with integral on board electronics resulting in greatly improved response time, greater endurance due to elimination of motor brushes and higher efficiency thereof for substantially improved power conservation and minimal heat losses.

In a first control scheme, a rider makes use of a touchscreen based device such as a cellphone to wirelessly monitor using Bluetooth low energy (BLE) status of front and rear derailleur actuation switches, bicycle speed sensor and wind load sensor, and additionally monitor through a Bluetooth wireless connection road inclination, vertical and forward bicycle acceleration as relayed by a shifter control unit directly wired to front derailleur, rear derailleur, chain movement sensor and a newly disclosed seat force sensor, compiles all received inputs through an application program (App) running on the touchscreen based device, and finally commands Bluetooth wireless shifter control unit to conduct resultant shifting actions based on manual and pre-programmed operator invoked semi-automatic and fully automatic control modes.

In a second and third control schemes, a rider makes use of a touchscreen based device such as a cellphone to wirelessly monitor using Bluetooth low energy (BLE) status of front and rear derailleur actuation switches, bicycle speed sensor, wind load sensor, road inclination sensor, vertical and forward bicycle acceleration sensors, and a seat force sensor, compiles all received inputs through an application program (App) running on the touchscreen based device, and finally commands through a Bluetooth wireless connection for the second scheme and a remote control (RC) servo wireless communication for the third scheme, wireless front and rear derailleurs to conduct resultant shifting actions based on manual and pre-programmed operator invoked semi-automatic and fully automatic control modes.

BRIEF DESCRIPTION OF THE DRAWINGS

FIG. 8 is a block diagram of a comprehensive control system for a bicycle making use of the second alternate embodiment of the front derailleur electrical actuator of the present invention.

FIG. 9A is an isometric frontal view of a front derailleur making use of the preferred embodiment of the front derailleur electrical actuator of the present invention.

FIG. 9B is an isometric rearward view of a front derailleur making use of the preferred embodiment of the front derailleur electrical actuator of the present invention.

FIG. 10A is an exploded frontal view of a front derailleur making use of the preferred embodiment of the front derailleur electrical actuator of the present invention.

FIG. 10B is a partially exploded frontal view of a front derailleur making use of the preferred embodiment of the front derailleur electrical actuator of the present invention.

FIG. 10C is an isometric view of a chain guide of a front derailleur making use of the preferred embodiment of the front derailleur electrical actuator of the present invention.

FIG. 11A is an exploded frontal view of a front derailleur making use of the preferred embodiment of the front derailleur electrical actuator of the present invention.

FIG. 11B is an isometric frontal view of a front derailleur body of a front derailleur making use of the preferred embodiment of the front derailleur electrical actuator of the present invention.

FIG. 11C is an isometric rearward view of a front derailleur body of a front derailleur making use of the preferred embodiment of the front derailleur electrical actuator of the present invention.

FIG. 11D is an isometric view of a front derailleur body cover of a front derailleur making use of the preferred embodiment of the front derailleur electrical actuator of the present invention.

FIG. 12A is an exploded rearward view of a front derailleur making use of the preferred embodiment of the front derailleur electrical actuator of the present invention.

FIG. 12B is a partially exploded rearward view of a front derailleur making use of the preferred embodiment of the front derailleur electrical actuator of the present invention.

FIG. 13A is an exploded rearward view of the wireless remote control (RC) servo drive unit made use of by the preferred and alternate embodiments of the front derailleur electrical actuator of the present invention.

FIG. 13B is an exploded rearward view of the digital magnetic rotary encoder assembly of the wireless remote control (RC) servo drive unit made use of by the preferred and alternate embodiments of the front derailleur electrical actuator of the present invention.

FIG. 13C is an exploded frontal view of the digital magnetic rotary encoder assembly of the wireless remote control (RC) servo drive unit made use of by the preferred and alternate embodiments of the front derailleur electrical actuator of the present invention.

FIG. 14A is an exploded frontal view of the wireless remote control (RC) servo drive unit made use of by the preferred and alternate embodiments of the front derailleur electrical actuator of the present invention.

FIG. 14B is an isometric assembly view of the wireless remote control (RC) servo drive unit made use of by the preferred and alternate embodiments of the front derailleur electrical actuator of the present invention.

FIG. 14C is an isometric view of back of the output shaft of the wireless remote control (RC) servo drive unit made use of by the preferred and alternate embodiments of the front derailleur electrical actuator of the present invention.

DETAILED DESCRIPTION OF THE INVENTION

Figure 1:
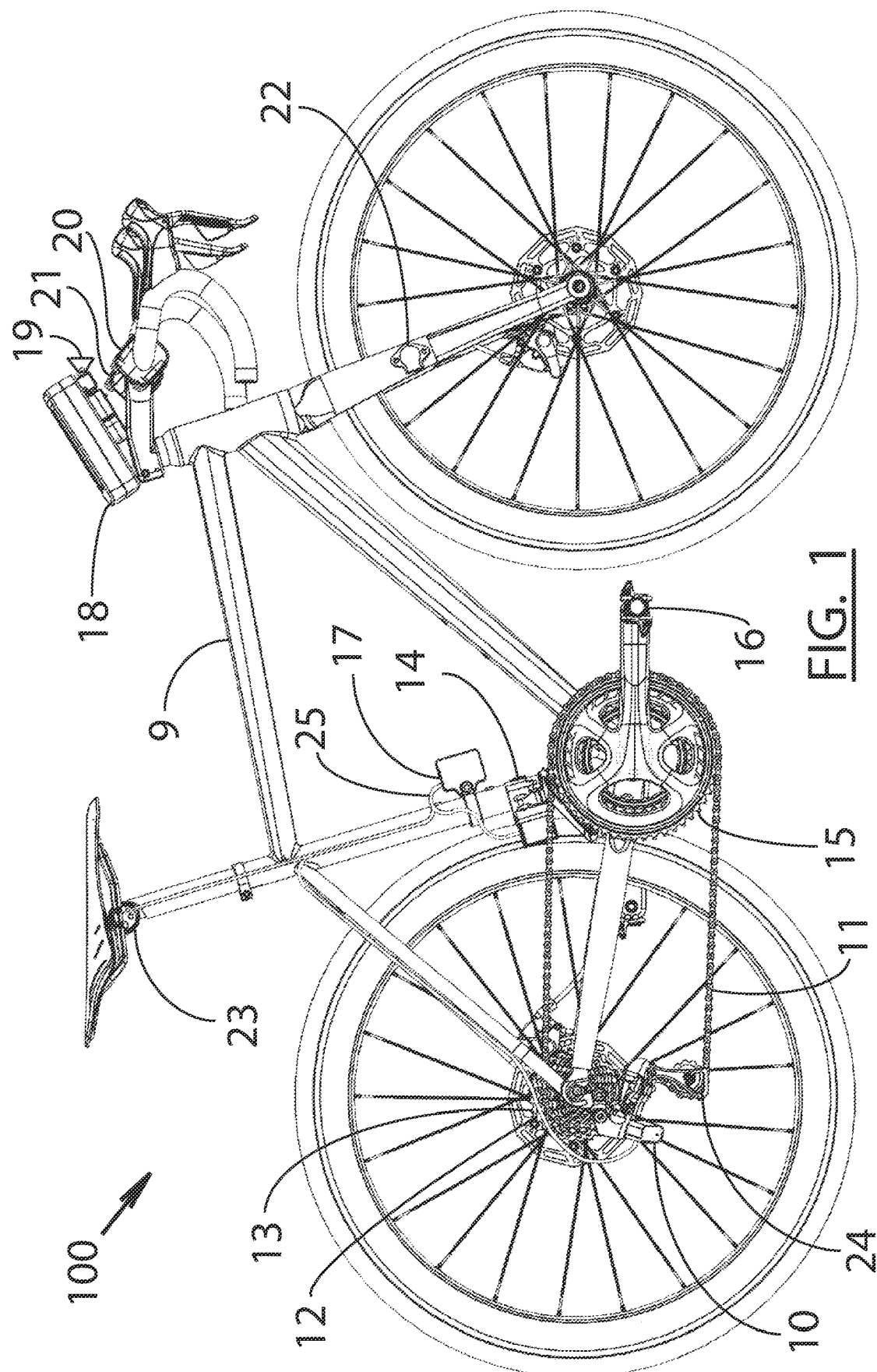
FIG. 1 is an overall view of the mechanical and electrical components of a bicycle making use of the preferred embodiment of the front derailleur electrical actuator of the present invention.
Figure 2:
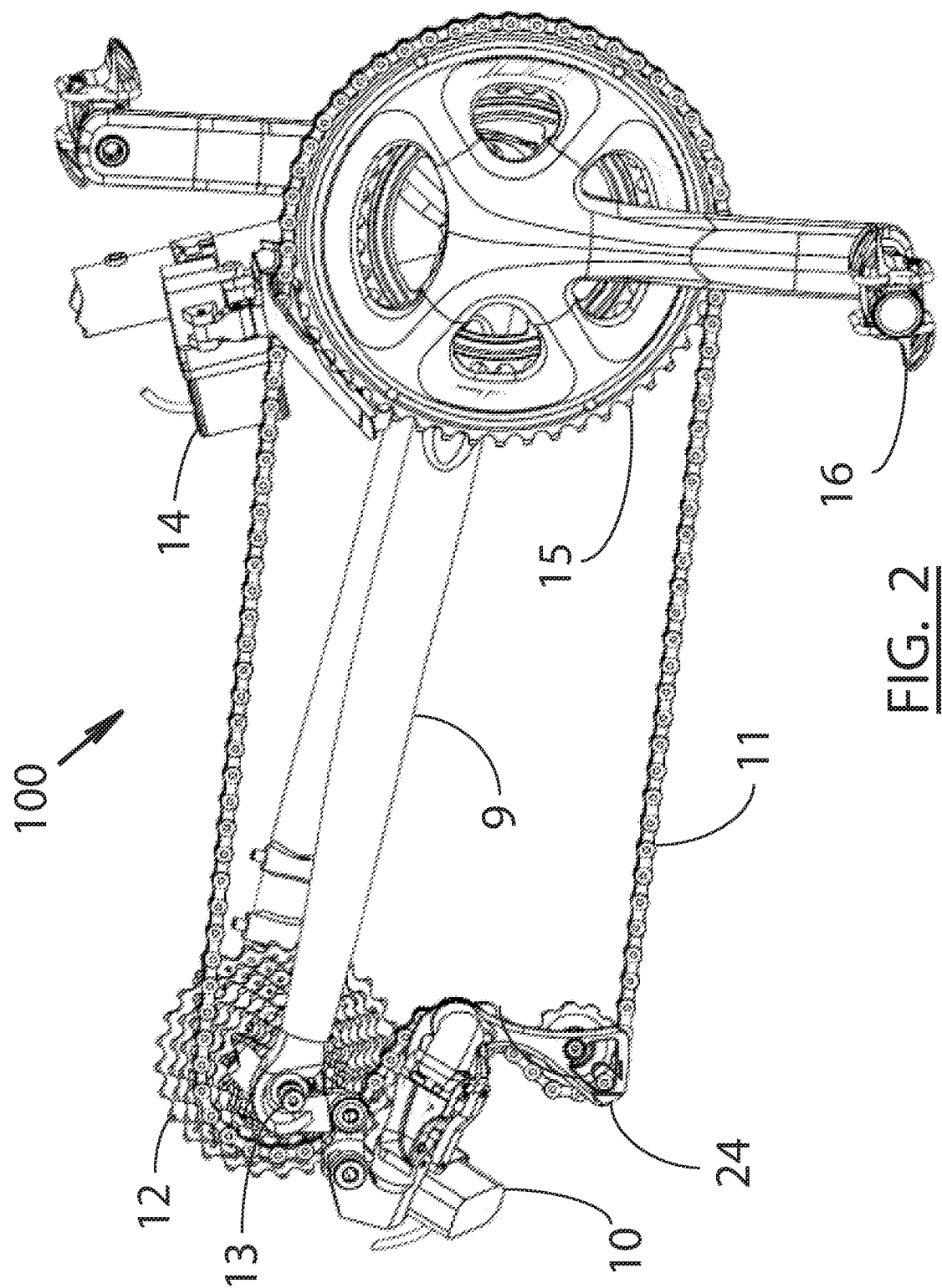
FIG. 2 is a perspective view of the powertrain of a bicycle making use of the preferred embodiment of the front derailleur electrical actuator of the present invention.
Figure 3:
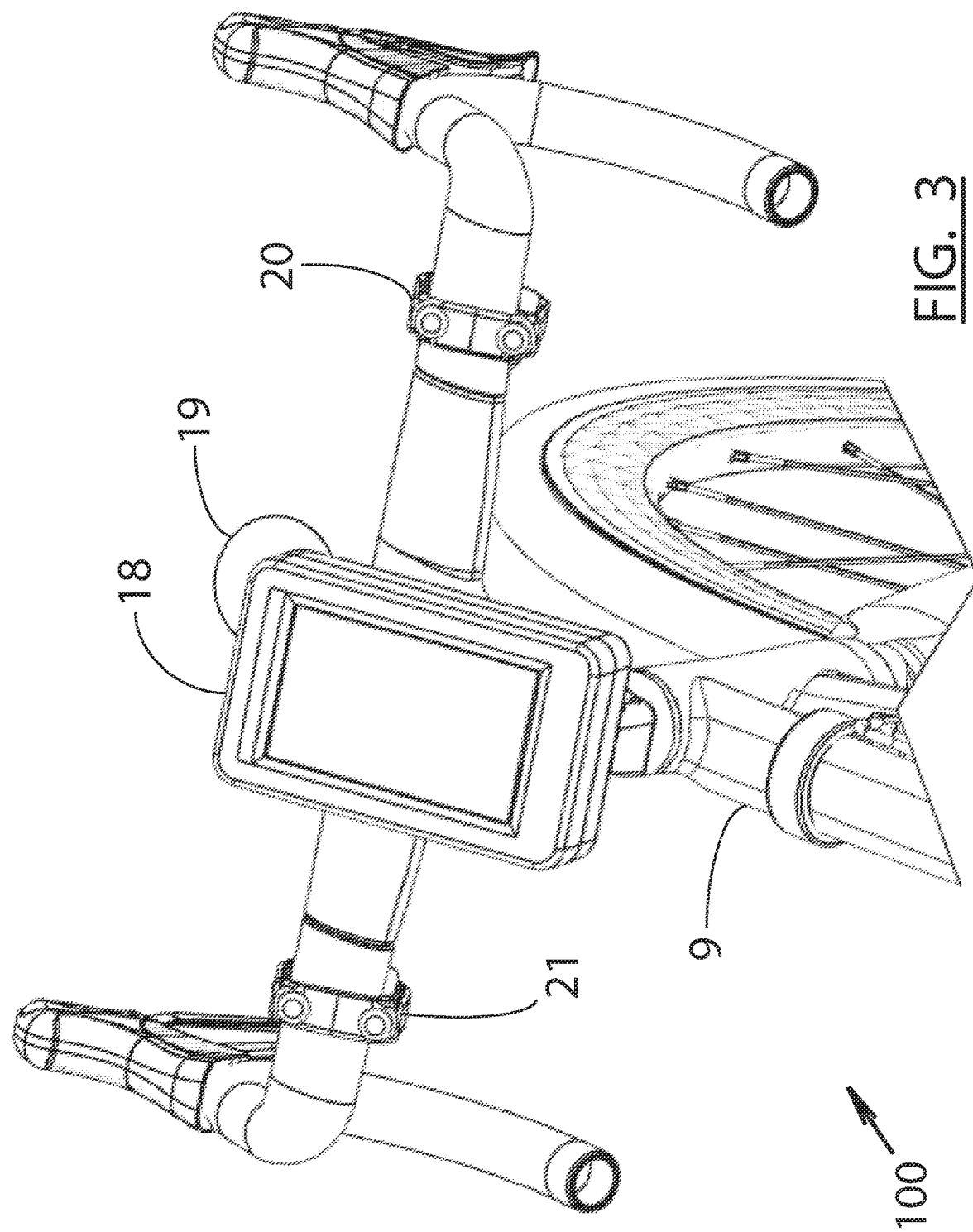
FIG. 3 is a perspective view of the operator command panel, hot wire anemometer and derailleur switches of a bicycle making use of the preferred embodiment of the front derailleur electrical actuator of the present invention.

Preferred Embodiment Construction—FIGS. 1-4.

With reference to FIGS. 1-4, the preferred embodiment 100 of a bicycle making use of the preferred embodiment front derailleur electrical actuator of the present invention comprises bicycle frame 9, rear derailleur 10 serving to alternate chain 11 between sprockets 12 of rear drive hub assembly 13, front derailleur 14 serving to alternate chain 11 between front sprockets assembly 15 of front pedals assembly 16, control system 17, operator command panel 18, how wire anemometer 19, rear derailleur switches 20, front derailleur switches 21, speed sensor 22, seat force sensor 23 and chain movement sensor 24. Partially shown wiring harness 25 serves to interconnect rear derailleur 10, front derailleur 14, seat force sensor 23 and chain movement sensor 25 to control system 17.

Figure 4:
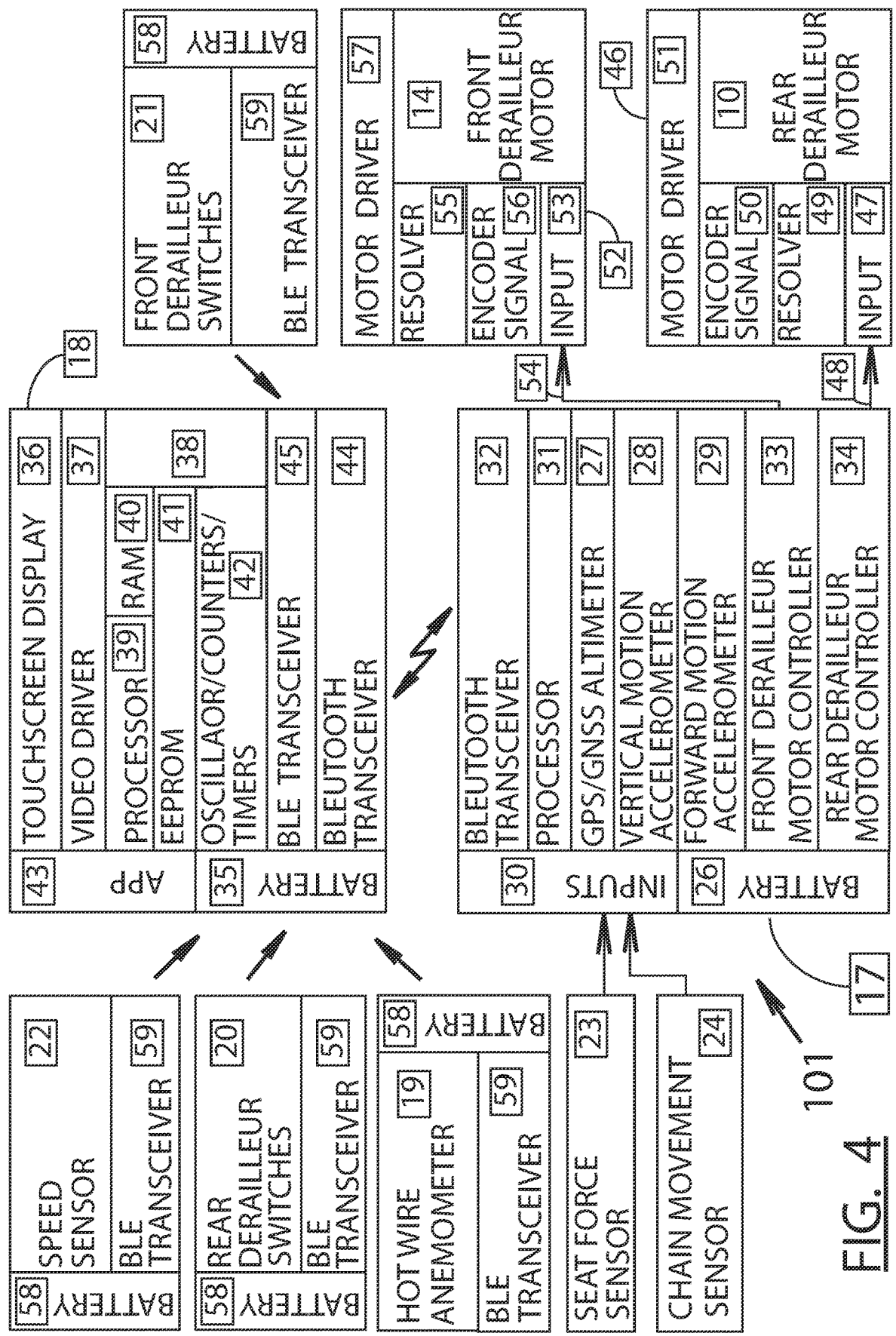
FIG. 4 is a block diagram of a comprehensive control system for a bicycle making use of the preferred embodiment of the front derailleur electrical actuator of the present invention.

Preferred Embodiment Controls—FIG. 4.

With reference to FIG. 4, the preferred embodiment 100 of a bicycle making use of controls block diagram 101 of the preferred embodiment of the front derailleur electrical actuator of the present invention includes Control system 17 comprising steady power supply rechargeable battery pack 26, GPS/GNSS altimeter 27, vertical motion accelerometer 28, forward motion accelerometer 29, input terminals 30 serving to receive readings of seat force sensor 23 and chain movement sensor 24, and processor 31 serving to relay status of chain movement sensor 24, seat force sensor 23, forward motion accelerometer 29, vertical motion accelerometer 28, GPS/GNSS altimeter 27 to operator command panel 18 through Bluetooth transceiver 32 and receive feedback and operator commands thereof in order execute control commands to front derailleur motor controller 33 and rear derailleur motor controller 34.

Operator command panel 18 comprising battery 35, touchscreen display 36, video driver 37, controls subsection 38 comprising processor 39, random access memory (RAM) 40, electrically erasable programmable read only memory (EEPROM) 41, oscillator/counters/timers subsection 42, acting as an integral system executing application program (APP) 43 serving to evaluate readings of chain motion sensor 24, seat force sensor 23, forward motion accelerometer 29, vertical motion accelerometer 28, GPS/GNSS altimeter 27, received through Bluetooth transceiver 44, and commands from rear derailleur switches 20, front derailleur switches 21, speed readings from speed sensor 22 and wind load readings from hot wire anemometer 19 received through Bluetooth Low Energy (BLE) transceiver 45, and in turn issue controls command to control system 17 for programmed energization of front derailleur motor controller 33 and rear derailleur motor controller 34 through Bluetooth transceiver 44.

Rear derailleur motor controls subsection 46 comprises input terminals 47 serving to receive power and control signal 48 from rear derailleur motor controller 34 of control system 17, comparator/resolver 49 serving to compare rear derailleur encoder signal 50 to received control signal 48 and accordingly bias motor driver 51 serving to power motor of rear derailleur 10.

Front derailleur motor controls subsection 52 comprises input terminals 53 serving to receive power and control signal 54 from front derailleur motor controller 33 of control system 17, comparator/resolver 55 serving to compare front derailleur encoder signal 56 to received control signal 54 and accordingly bias motor driver 57 serving to power motor of front derailleur 14.

Operating as individually powered standard Bluetooth Low Energy (BLE) spectrum protocol discrete transmission units, speed sensor 22, front derailleur switches 21, rear derailleur switches 20 and hot wire anemometer 19, each comprising own battery 58 for power and own Bluetooth Low Energy (BLE) transceiver 59, serve to respectively transmit bicycle speed, operator commands, and wind speed with data thereof intercepted by BLE transceiver 45 for data processing through APP 43 of operator command panel 18.

Figure 5:
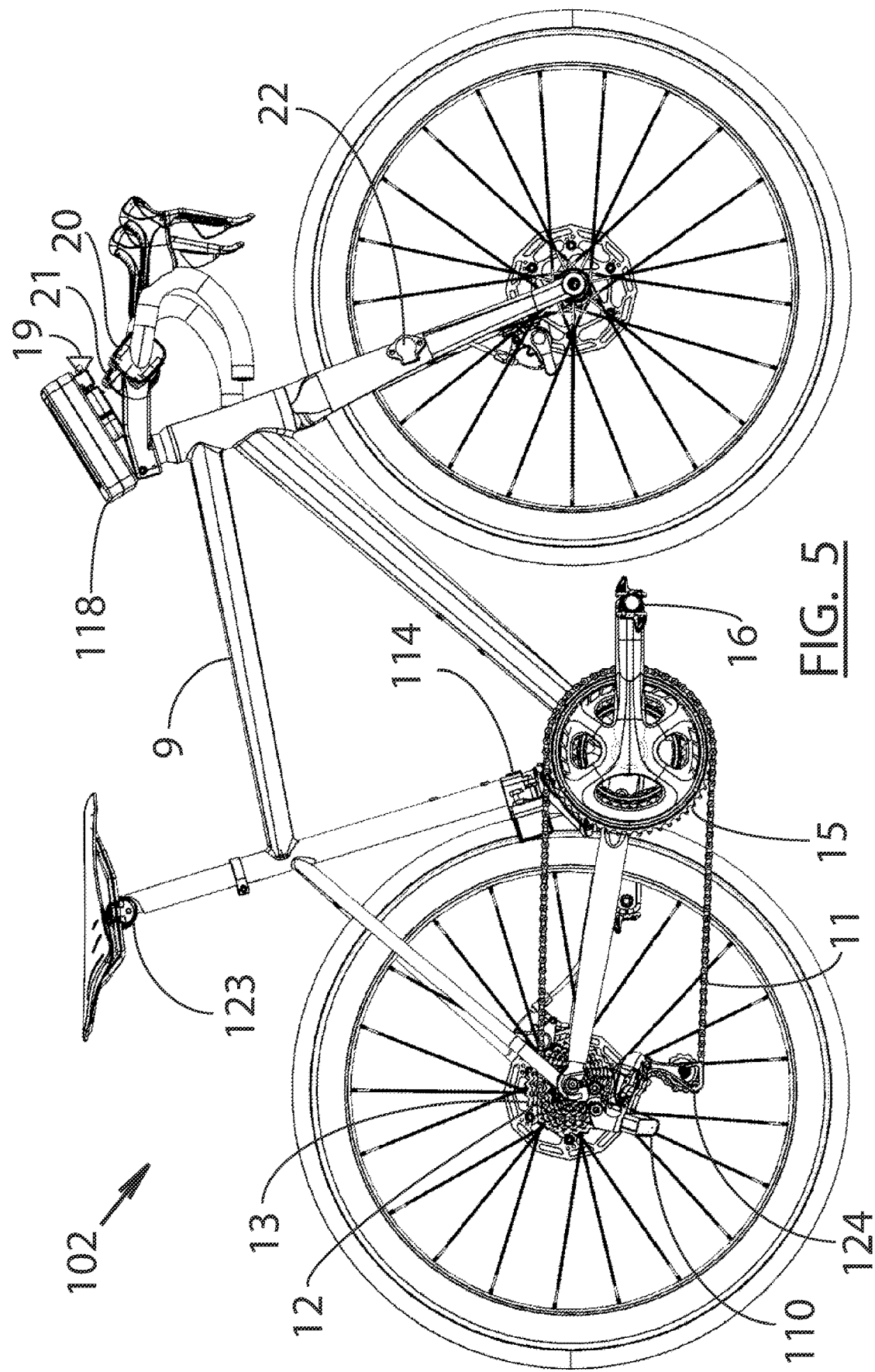
FIG. 5 is an overall view of the mechanical and electrical components of a bicycle making use of the first alternate embodiment of the front derailleur electrical actuator of the present invention.
Figure 6:
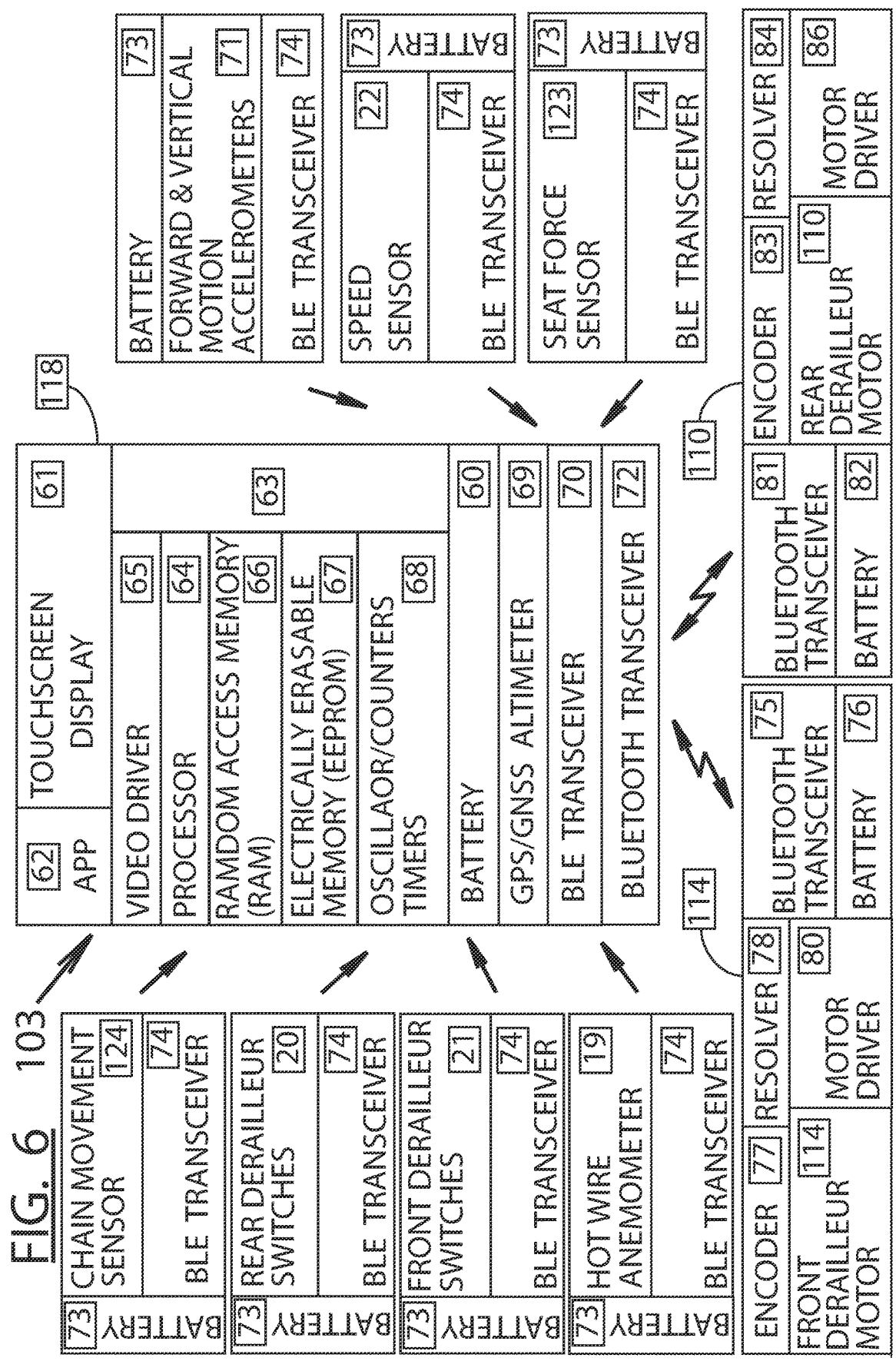
FIG. 6 is a block diagram of a comprehensive control system for a bicycle making use of the first alternate embodiment of the front derailleur electrical actuator of the present invention.

First Alternate Embodiment Construction—FIGS. 5 & 6.

With reference to FIGS. 5 & 6, the first alternate embodiment 102 of a bicycle making use of the first alternate embodiment front derailleur electrical actuator of the present invention comprises bicycle frame 9, rear derailleur 110 serving to alternate chain 11 between sprockets 12 of rear drive hub assembly 13, front derailleur 114 serving to alternate chain 11 between front sprockets assembly 15 of front pedals assembly 16, operator command panel 118, how wire anemometer 19, rear derailleur switches 20, front derailleur switches 21, speed sensor 22, seat force sensor 123 and chain movement sensor 124.

First Alternate Embodiment Controls—FIG. 6.

With reference to FIG. 6 again, the first alternate embodiment 102 of a bicycle making use of controls block diagram 103 of the first alternate embodiment front derailleur electrical actuator of the present invention comprising control panel 118 acting as a central wireless system controller powered by battery 60, displaying system status and receiving operator commands through touchscreen display 61 based on application program (App) 62 executing on microcontroller subsection 63 including processor 64, video driver 65, random access memory (RAM) 66, electrically erasable programmable read only memory (EEPROM) 67, oscillator/counters/timers subsection 68, based on signals received from integral GPS/GNSS Altimeter 69 and through Bluetooth Low Energy (BLE) transceiver 70 wireless signals received from speed sensor 22, front derailleur switches 21, rear derailleur switches 20, hot wire anemometer 19, seat force sensor 123, chain movement sensor 124 and forward and vertical motion accelerometers 71, serves to wirelessly command each of battery powered front derailleur 114 and battery powered rear derailleur 110 through own integral Bluetooth transceiver 72.

Operating as individually powered standard Bluetooth Low Energy (BLE) spectrum protocol discrete transmission units, chain movement sensor 124, seat force sensor 123, speed sensor 22, front derailleur switches 21, rear derailleur switches 20, hot wire anemometer 19, and forward and vertical motion accelerometers 71, each comprising own battery 73 for power and own Bluetooth Low Energy (BLE) transceiver 74, serve to transmit chain movement, seat force, bicycle speed, front and rear derailleur operator commands, wind speed, and forward and vertical accelerations respectively to operator command panel 118 intercepted through BLE transceiver 70 for data processing thereof through APP 62.

Relying on wireless Bluetooth transceiver 75 serving to relay derailleur position and receive derailleur position commands from control panel 118, front derailleur 114 additionally comprises, battery 76 serving to provide power and digital magnetic rotary encoder 77 serving to relay actual derailleur position to comparator/resolver 78 used to compare actual derailleur position thereof to desired derailleur position received from control panel 118 and accordingly bias motor driver 80 serving to power electrical motor of front derailleur 114.

Relying on wireless Bluetooth transceiver 81 serving to relay derailleur position and receive derailleur position commands from control panel 118, rear derailleur 110 additionally comprises, battery 82 serving to provide power and digital magnetic encoder 83 serving to relay actual derailleur position to comparator/resolver 84 used to compare actual derailleur position thereof to desired derailleur position received from control panel 118 and accordingly bias motor driver 86 serving to power electrical motor of rear derailleur 110.

Figure 7:
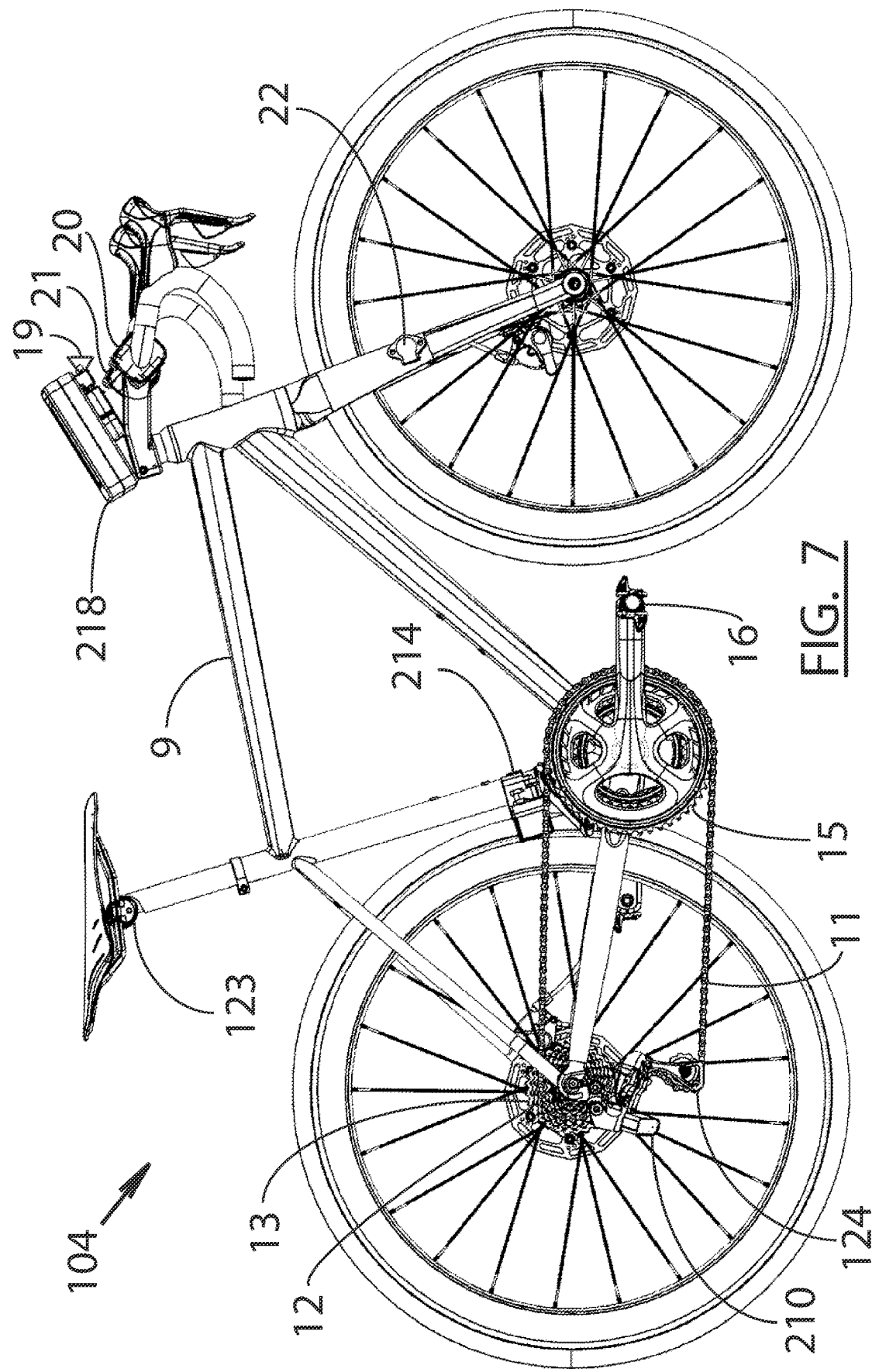
FIG. 7 is an overall view of the mechanical and electrical components of a bicycle making use of the second alternate embodiment of the front derailleur electrical actuator of the present invention.
Figure 8:
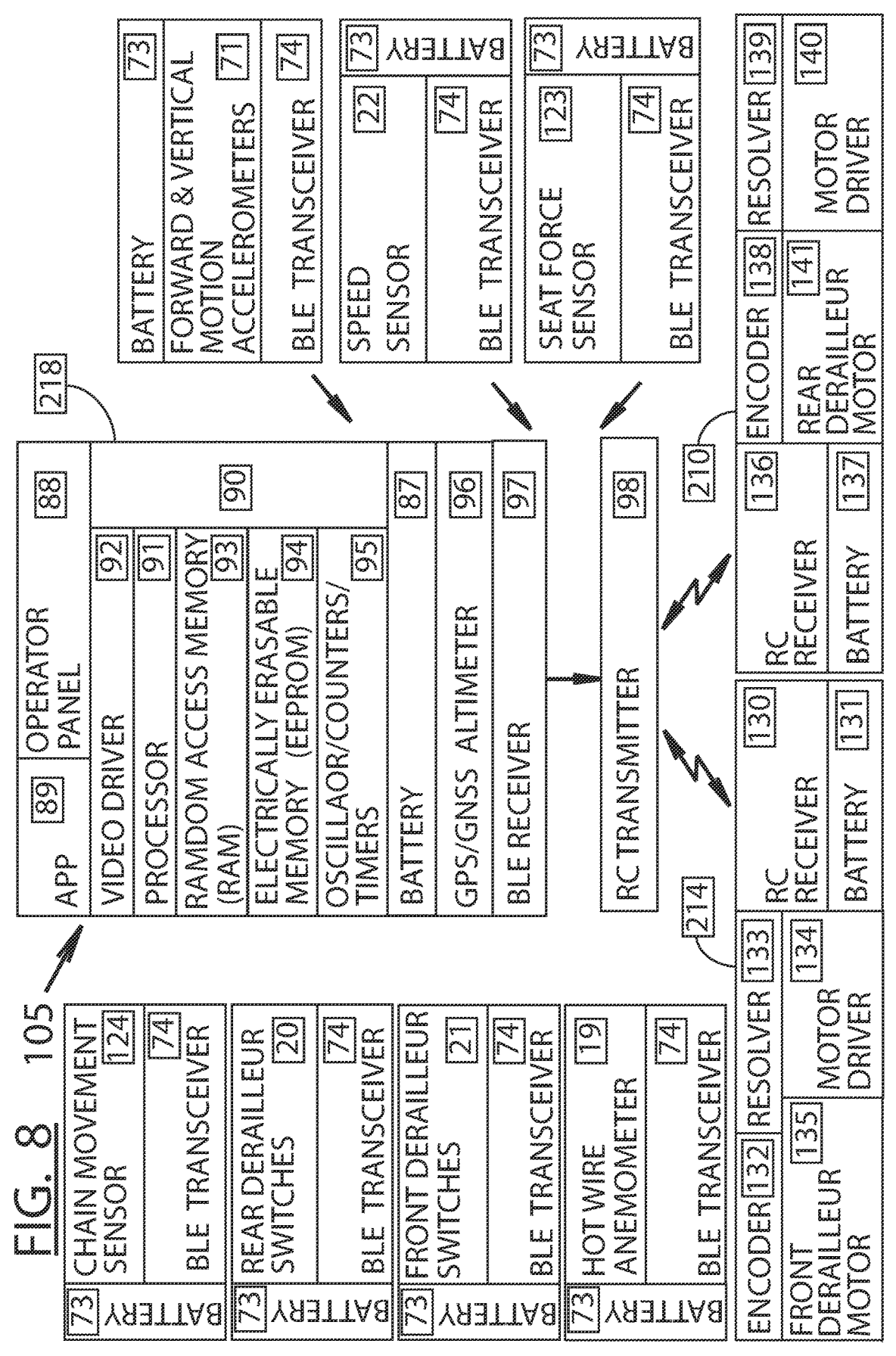

Second Alternate Embodiment Construction—FIGS. 7 & 8.

With reference to FIGS. 7 & 8, the second alternate embodiment 104 of a bicycle making use of making use of the second alternate embodiment front derailleur electrical actuator of the present invention comprises rear derailleur 210 serving to alternate chain 11 between sprockets 12 of rear drive hub assembly 13, front derailleur 214 serving to alternate chain 11 between front sprockets assembly 15 of front pedals assembly 16, operator command panel 218, how wire anemometer 19, rear derailleur switches 20, front derailleur switches 21, speed sensor 22, seat force sensor 123 and chain movement sensor 124.

Second Alternate Embodiment Controls—FIG. 8.

With reference to FIG. 8 again, the second alternate embodiment 104 of a bicycle making use of controls block diagram 105 of the second alternate embodiment front derailleur electrical actuator of the present invention comprising control panel 218 acting as a central wireless system controller powered by battery 87, displaying system status and receiving operator commands through touchscreen display 88 based on application program (App) 89, executing on microcontroller subsection 90 including processor 91, video driver 92, random access memory (RAM) 93, electrically erasable programmable read only memory (EEPROM) 94, oscillator/counters/timers subsection 95, based on signals received from integral GPS/GNSS Altimeter 96, and through Bluetooth Low Energy (BLE) transceiver 97 wireless signals received from chain movement sensor 124, seat force sensor 123, speed sensor 22, front derailleur switches 21, rear derailleur switches 20, hot wire anemometer 19, and forward and vertical motion accelerometers 71, serves to wirelessly command each of wireless battery powered front derailleur 214 and wireless battery powered rear derailleur 210 through standard wireless remote control (RC) servo transmitter 98.

Operating as individually powered standard Bluetooth Low Energy (BLE) spectrum protocol discrete transmission units, chain movement sensor 124, seat force sensor 123, speed sensor 22, front derailleur switches 21, rear derailleur switches 20, hot wire anemometer 19, and forward and vertical motion accelerometers 71, each comprising own battery 73 for power and own Bluetooth Low Energy (BLE) transceiver 74, serve to transmit chain movement, seat force, bicycle speed, front and rear derailleur operator commands, wind speed, and forward and vertical accelerations respectively to operator command panel 218 intercepted through BLE transceiver 97 for data processing thereof through APP 89.

Relying on standard wireless remote control (RC) servo receiver 130 serving to receive derailleur position commands from control panel 218, front derailleur 214 additionally comprises, battery 131 serving to provide power and digital magnetic encoder 132 serving to relay actual derailleur position to comparator/resolver 133 used to compare actual derailleur position thereof to desired derailleur position received from control panel 218 and accordingly bias motor driver 134 serving to power electrical motor 135 of front derailleur 214.

Relying on standard wireless remote control (RC) servo receiver 136 serving to receive derailleur position commands from control panel 218, rear derailleur 210 additionally comprises, battery 137 serving to provide power and digital magnetic encoder 138 serving to relay actual derailleur position to comparator/resolver 139 used to compare actual derailleur position thereof to desired derailleur position received from control panel 218 and accordingly bias motor driver 140 serving to power electrical motor 141 of rear derailleur 210.

Front Derailleur Construction—FIGS. 9A, 9B & 10A-10C

With reference to frontal, rearward, exploded and isometric views depicted in FIGS. 9A, 9B & 10A-10C respectively, the preferred embodiment front derailleur 14 of the preferred embodiment of the bicycle front derailleur electrical actuator of the present invention comprises three prong connector 150 delivering power and control signal 54 to front derailleur body assembly 151 secured to bicycle frame 9 by derailleur mount bracket 152 comprising mount bracket collar 153 including slot 154 for vertically adjustable mounting of front derailleur 14 thereto by screw 155 into tapped hole 156 in front derailleur body assembly 151, and hinged collar clamp 157 with bolt 158 extending through hole 159 thereof and locked into tapped hole 160 of mount bracket collar 153 about bicycle frame 9 for affixed retention of front derailleur 14 thereto. With actuation of front derailleur 14 achieved solely through rotation of actuation shaft 161 rotationally affixed to actuation link 162 at one end with opposite end thereof pivotally secured to chain guide 163 by axle 164 and with idler link 165 of predominantly equal length pivotally secured to front derailleur body assembly 151 by axle 166 and to chain guide 163 at opposite end by axle 167, sheer linear translation of chain guide 163 is ensured through equal lateral orthogonal displacements of axle 166 from actuation shaft 161 to that of axle 167 from axle 164 thereby completing a four bar mechanism configuration with equal lengths opposing members. Accurate actuation and proper alignment of front derailleur 14 is ensured through proper fitment of axle 167 press fit into each of two inline bores 168 of chain guide 163 and accurate slip fit thereof into bore 169 of idler link 165 with breadth thereof properly controlled for accurate fit between bifurcating banks 170 of inline bores 168, and with axle 166 at opposite end press fit into two inline bores 171 of Front Derailleur Body 151 and accurate slip fit into bore 172 of idler link 165 with breadth thereof accurately fit between bifurcating banks 173 of inline bores 171. Conversely, drive shaft 161 is press fit into bore 174 of actuation link 162, slip fit into bore 175 of front nose lateral extension 176 of front derailleur body assembly 151 with breadth of actuation link 162 thereof properly controlled for accurate slip fit between front nose lateral extension 176 of bore 175 and thereof opposing extension 177 of front derailleur body assembly 151, and with axle 164 at opposing end press fit into two inline bores 178 of chain guide 163 and slip fit into bore 179 of actuation link 162 with breadth thereof accurately fit between bifurcating banks 180 of two inline bores 178.

Front Derailleur Actuator Construction—FIGS. 11A-11D, 12A & 12B.

With reference to FIGS. 11A-11D, 12A & 12B, the preferred embodiment of the bicycle derailleur electrical actuator 201 of front derailleur 14 of the present invention comprises derailleur body 221 including semi-cylindrical front nose 222 with matching periphery to mount bracket collar 153 of derailleur mount bracket 152 for retention thereto by screw 155 extending through slot 154 of mount bracket collar 153 and into tapped hole 156 thereof with further affixation to bicycle frame 9 achieved through collapse of derailleur mount bracket 152 by tightening of screw 158 serving to draw hinged collar clamp 157 toward mount bracket collar 153 about bicycle frame 9. Derailleur body 221 further comprises in-line bores 171 centrally disposed in bifurcating lateral extensions 173 thereof serving as press fit retention means for axle 166 serving as a hinge for idler link 165 through slip fit bore 172, bore 175 centrally disposed in lateral extension 176 of front nose 222 serving as support hinge for actuation shaft 161 permanently affixed to output shaft 223 of servo drive unit 202 extending through bore 224 of derailleur body 221 with groove 225 and housing o'ring 226 serving to seal rotary actuation joint of output shaft 223, stubby rectangular extension 227 including hollow bores configuration 228 serving to house mating servo drive unit 202 and flat surface 229 including tapped holes 230 serving to secure base plate 231 of servo drive unit 202 thereto by screws 232 with flat surface 229 thereof additionally including tapped holes 233 serving to seal servo drive unit 202 internally to derailleur body 221 through matching periphery rectangular gasket 234 and drive unit cover 235 secured thereto by screws 236. With reference to FIG. 11D again, drive unit cover 235 further includes cavity 237 serving to house protruding extension of servo drive unit 202 from derailleur body 221, flat surface 238 serving as sealing surface for gasket 234 and through holes 239 that screws 236 extend through to mate drive unit cover 235 to derailleur body 221.

Front Derailleur Drive Assembly Construction—FIGS. 13A-13C, 14A-14C

With reference to FIGS. 13A-13C, 14A-14C, the preferred embodiment of the front derailleur electrical actuator assembly 201 of front derailleur 14 of the present invention makes use of servo drive unit 202 comprising drive motor 260 secured to base plate 231 by screws 261, with terminals thereof soldered directly onto output traces of servo electronics board 262 and with output shaft thereof rotationally affixed to pinion 263 protruding through cylindrical interior cavity of lateral semi-cylindrical extension 264 of base plate 231 to engage first stage driven gear 265 rotationally affixed to smaller second stage driver gear 266 with though bore 267 thereof rotationally supported by axle 268 affixed to base plate 231. Second stage driver gear 266 engages second stage driven gear 269 rotationally affixed to smaller third stage driver gear 270 and with cylindrical hollowed out interior 271 partially supported by lateral semi-cylindrical extension 264 and through bore 272 thereof rotationally supported by axle 273 affixed to lateral semi-cylindrical extension 264 of base plate 231. Third stage driver gear 270 engages third stage driven gear 274 rotationally affixed to smaller fourth stage driver gear 275 and with through bore 276 thereof rotationally supported by axle 268 in turn driving fourth stage driven gear 277 rotationally affixed to output shaft 223. Serving as the actuation member of servo drive unit 202, output shaft 223 includes circular opposite end 278 extending past fourth stage driven gear 277 and bore 279 for seating of supporting roller bearing 280 with inner race affixed to close fitting supporting circular protrusion 281 of base 231.

Front Derailleur Position Feedback—FIGS. 13A-13C, 14A-14C

With reference to FIGS. 13A-13C, 14A-14C again, the preferred embodiment of the front derailleur electrical actuator assembly 201 of front derailleur 14 of the present invention embodies servo drive unit 202 making use of recently commercially available digital magnetic encoder comprising a magnetic sensor chip with digitally encoded output proportionate to orientation of overhead flux a standard bipolar magnet. With application thereof readily available in standard wireless remote control (RC) servo assembly implemented in this construction, servo drive unit 202 of the preferred embodiment 201 of the front derailleur electrical actuator assembly of the present invention comprises rearward extension 282 of base plate 231 serving as mount for magnetic encoder board 283 of magnetic encoder integrated circuit chip 284 by screws 285, and properly positioned thereto bipolar magnet 286 disposed in central cavity 287 of cylindrical stub 288 of encoder shaft 289 rotationally operable in bore 290 of circular protrusion 281 of base plate 231 and with flats 291 thereof rotationally retained into closely matching slot 292 in base of bore 279 of circular opposite end 278 of output shaft 223 for direct sensing of rotational position thereof. For improved rotational position accuracy sensing of output shaft 223, flats 291 of encoder shaft 289 are typically potted into receiving matching slot 292 of output shaft 223 so that bipolar magnet 286 is rotationally locked to output shaft 223 and thereby resultant readings of encoder board 283 directly correspond to position of output shaft 223.

Figure 15B:
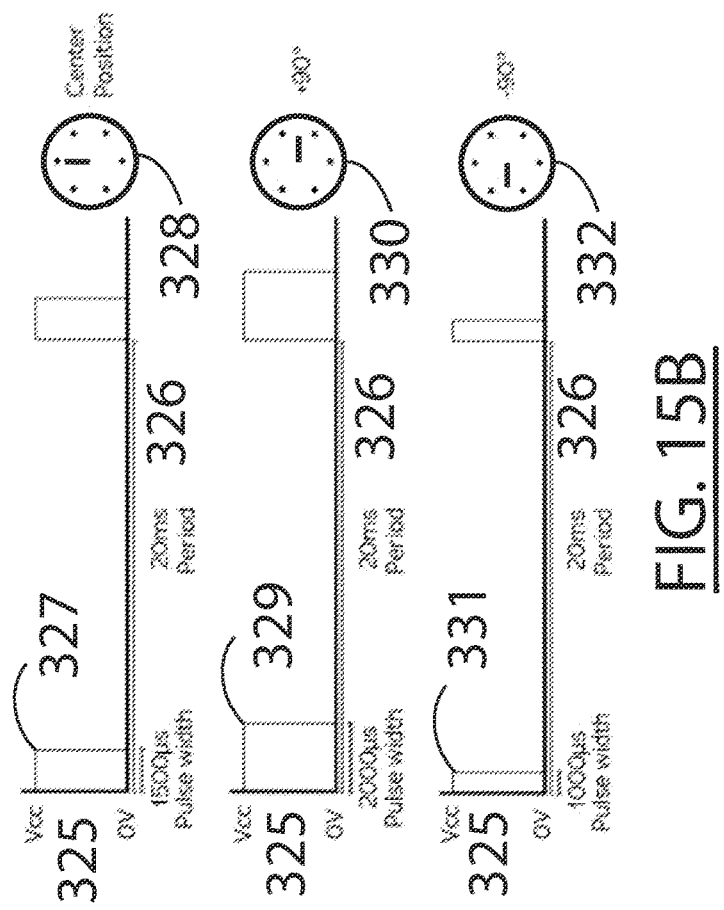
FIG. 15B is a chart depicting pulse width modulation (PWM) control of the wireless remote control (RC) servo drive unit made use of by the preferred and alternate embodiments of the front derailleur electrical actuator of the present invention.
Figure 15A:
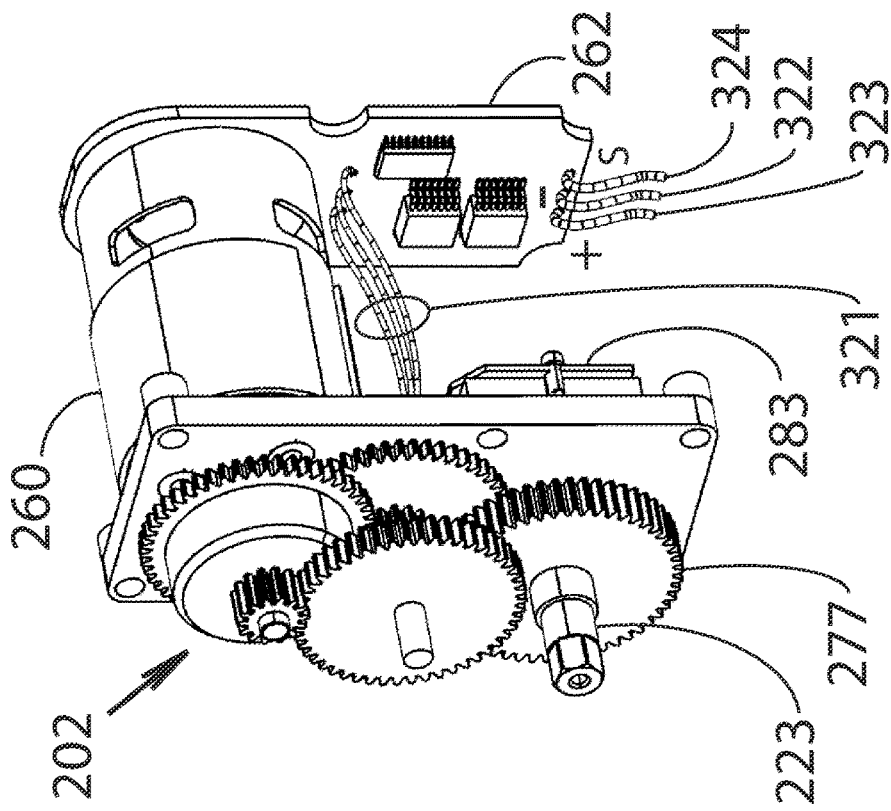
FIG. 15A is an isometric assembly view depicting positional feedback, power supply and actuation signal wiring of the wireless remote control (RC) servo drive unit made use of by the preferred and alternate embodiments of the front derailleur electrical actuator of the present invention.

Front Derailleur Position Feedback—FIGS. 15A & 15B

With reference to FIGS. 15A & 15B, as clearly depicted prior, the preferred embodiment of the front derailleur electrical actuator assembly 201 of front derailleur 14 of the present invention and consequentially front derailleur 14 thereof bears an actuation position in direct and linear relation to that of servo drive unit 202.

With reference to FIG. 15A again, closed loop feedback control of servo electronics board 262 is facilitated by connection thereto of output wiring 321 of digital magnetic encoder board 283 serving to relay position of output shaft 223 and consequently that of actuation shaft 161 permanently affixed to output shaft 223, and thereby actual position of front derailleur actuator assembly 201. Additionally, servo drive unit 202 implemented in the preferred embodiment of the front derailleur electrical actuator assembly 201 of the present invention makes use of among many available wireless remote control (RC) servo protocols, that of pulse width modulation (PWM) typically in the 50 hertz (HZ) range with pulse width typically ranging from 1000 microseconds to 2000 microseconds thereof being directly linearly proportional to output position of servo output member, output shaft 223 and consequentially output shaft 161 of front derailleur electrical actuator assembly 201 of front derailleur 14.

With the sole connection to servo electronics board 262 being three wires with power being supplied by negative wire 322 and positive wire 323, and with the third wire 324 delivering front derailleur control signal 54 with voltage 325 thereof charted in FIG. 15B with a nominal value Vcc on the ordinate vs. time 326 on the abscissa, at typical actuation frequency of around 50 hertz (HZ) a pulse width 327 of 1500 microseconds at nominal control voltage Vcc results in servo unit 202 movement to center position of output shaft 223 as depicted in dial 328 in FIG. 15B, with pulse width 329 of 2000 microseconds commanding servo drive unit 202 to move output shaft 223 to extreme clockwise position as depicted in dial 330, and with pulse width 331 of 1000 microseconds commanding servo drive unit 202 to move output shaft 223 to extreme counterclockwise position as depicted in dial 332. Needing not be emphasized is that these relations are for reference only and that a direct and linear relationship is exists between value of pulse width signal 56 of control signal wire 324 in microseconds to command position of servo drive unit 202 and thereby front derailleur electrical actuator assembly 201 and consequentially front derailleur 14.

The invention claimed is:

1. A front derailleur electrical actuator comprising,
a) a housing including a first gearing cavity,
b) said housing further including a flat surface, a plurality of tapped holes for mounting of a closure cover,
c) said closure cover including a second gearing cavity, a flat surface with a plurality of through holes for insertion of a plurality of mounting screws to said housing,
d) said flat surface of the housing further including a plurality of tapped holes for mounting of a spur gearing assembly,
e) said spur gearing assembly including a mounting plate with a plurality of through holes for insertion of a plurality of mounting screws to said housing,
f) said spur gearing assembly further including an electric motor with a spur gearing pinion,
g) said spur gearing pinion in constant mesh with a first stage driven spur gear affixed to a second stage driver spur gear,
h) said second stage driver spur gear in constant mesh with a second stage driven spur gear affixed to a third stage driver spur gear,
i) said third stage driver spur gear in constant mesh with a third stage driven spur gear affixed to a fourth stage driver spur gear,
j) said fourth stage driver spur gear in constant mesh with a fourth stage driven spur gear,
k) said fourth stage driven spur gear further including a rearward extension housing a magnet disposed thereof in relation to a fixed digital magnetic rotary encoder,
l) said fourth stage driven spur gear further including a frontal extension with an output shaft rotationally secured to an actuation shaft permanently affixed to an actuation link of a front derailleur,
m) said spur gearing assembly further including a comparator electronics assembly including a motor amplifier connected to said electric motor, and
n) said comparator electronics assembly further including a position feedback input for said fixed digital magnetic rotary encoder, a negative power terminal input, a positive power terminal input and a signal input for a pulse width modulation signal with a predefined relation to position of said magnet of said fixed digital magnetic rotary encoder,
whereby upon receiving a powering voltage differential across said positive power terminal input and said negative power terminal input and a pulse width modulation signal through said signal input, said comparator electronics assembly computes differential between said pulse width modulation signal and that corresponding to reading of said fixed digital magnetic rotary encoder, biases said motor amplifier accordingly, thereby actuating said electric motor to a balancing position thereof, resulting in actuation of said actuation link of said front derailleur through said actuation shaft through said output shaft through said spur gearing assembly to a new position satisfying said received pulse width modulation signal.

2. The front derailleur electrical actuator of claim 1 further including a bifurcating lateral extension with a set of in-line bores for a pivot shaft of an idler link of said front derailleur.

3. The front derailleur electrical actuator of claim 1 further including a frontal nose extension with a tapped hole for mounting to an adapter mount secured to a frame of a bicycle.

4. The front derailleur electrical actuator of claim 1 wherein said housing further including a supporting frontal extension for said actuation shaft.

5. The front derailleur electrical actuator of claim 1 further including an o'ring groove for receipt of sealing o'ring for said output shaft.

6. The front derailleur electrical actuator of claim 1 further including a sealing gasket disposed between said housing and said closure cover.

7. The front derailleur electrical actuator of claim 1 wherein said comparator electronics assembly is directly affixed to terminals of said electric motor.

8. The front derailleur electrical actuator of claim 1 wherein said pulse width modulation signal varies between 1000 and 2000 microseconds with a period of 20 milliseconds.

9. The front derailleur electrical actuator of claim 1 wherein a nominal voltage of said pulse width modulation signal is of a fixed value between 5 volts and 10 volts.

10. A front derailleur electrical actuator comprising,
a) a two-piece housing and a sealing gasket,
b) said two-piece housing including a cavity for a spur gearing reduction assembly,
c) said spur gearing reduction assembly including an electric motor with a spur gearing pinion in constant mesh with a first stage spur gearset,
d) said first stage spur gearset coupled to a second stage spur gearset,
e) said second stage spur gearset coupled to a third stage spur gearset,
f) said third stage spur gearset coupled to a fourth stage gearset with an output shaft, g) said output shaft of said fourth stage spur gearset rotationally secured to an actuation shaft permanently affixed to actuation link of a front derailleur, h) said spur gearing reduction assembly further including a digital magnetic rotary encoder with position magnet thereof rotationally retained to said output shaft of said fourth stage spur gearset, i) said spur gearing reduction assembly further including a comparator electronics assembly including a motor amplifier connected to said electric motor, and j) said comparator electronics assembly further including a position feedback input for said digital magnetic rotary encoder, a negative power terminal input, a positive power terminal input and a signal input for a pulse width modulation signal with a predefined relation to position of said position magnet of said digital magnetic rotary encoder, whereby upon receiving a powering voltage differential across said positive power terminal input and said negative power terminal input and a pulse width modulation signal through said signal input, said comparator electronics assembly computes differential between said pulse width modulation signal and that corresponding to reading of said digital magnetic rotary encoder, biases said motor amplifier accordingly, thereby actuating said electric motor to a balancing position thereof, resulting in actuation of said actuation link of said front derailleur through said actuation shaft through said output shaft of said spur gearing reduction assembly to a new position satisfying said received pulse width modulation signal.

11. The front derailleur electrical actuator of claim 10 wherein said electric motor is a brushed dc motor.

12. The front derailleur electrical actuator of claim 10 wherein said electric motor is a brushed coreless dc motor.

13. The front derailleur electrical actuator of claim 10 wherein said electric motor is a brushless ac motor and said comparator electronics assembly further including a motor commutation electronics.

14. The front derailleur electrical actuator of claim 10 wherein said comparator electronics assembly is directly affixed to terminals of said electric motor.

15. The front derailleur electrical actuator of claim 10 wherein said spur gearing reduction assembly makes use of quadruple gearing reduction.

* * * * *